5,256,450

United States Patent [19]

Catena

[11] Patent Number: 5,256,450
[45] Date of Patent: Oct. 26, 1993

[54] PROCESS FOR IMPREGNATING POROUS METAL ARTICLES USING WATER MISCIBLE ANAEROBIC SEALANTS

[75] Inventor: Willaim J. Catena, Lake Hiawatha, N.J.

[73] Assignee: National Starch and Chemical Investment Holding Corporation, Wilmington, Del.

[21] Appl. No.: 912,446

[22] Filed: Jul. 13, 1992

Related U.S. Application Data

[63] Continuation-in-part of Ser. No. 574,826, Aug. 29, 1990, abandoned.

[51] Int. Cl.$^5$ ............................. B05D 3/00; C09J 4/02
[52] U.S. Cl. ................................... 427/295; 427/294; 427/353; 523/176; 526/320
[58] Field of Search ................ 427/294, 295, 297, 353, 427/354, 388.1, 393; 523/176; 526/320

[56] References Cited

U.S. PATENT DOCUMENTS

| | | | |
|---|---|---|---|
| Re. 32,240 | 9/1986 | DeMarco | 526/328 |
| 2,895,950 | 7/1959 | Krieble | 260/89.5 |
| 3,043,820 | 7/1962 | Krieble | 526/320 |
| 3,435,012 | 3/1969 | Nordlander | 526/320 |
| 3,672,942 | 6/1972 | Neumann et al. | 117/62.2 |
| 3,701,676 | 10/1972 | Bader et al. | 117/49 |
| 3,880,956 | 4/1975 | Skoultchi | 526/320 |
| 3,969,552 | 7/1976 | Malofsky et al. | 427/295 |
| 4,055,542 | 10/1977 | Saito | 260/47 UA |
| 4,103,081 | 7/1978 | Repetto | 523/176 |
| 4,147,821 | 4/1979 | Young | 427/295 |
| 4,165,400 | 8/1979 | DeMarco | 427/295 |
| 4,215,209 | 7/1980 | Ray-Chaudhuri et al. | 526/292 |
| 4,235,986 | 11/1980 | Catena | 526/320 |
| 4,311,735 | 1/1981 | Young | 427/295 |
| 4,416,921 | 11/1983 | Dunn | 427/353 |
| 5,006,233 | 4/1991 | Muisener | 210/96.1 |
| 5,098,743 | 3/1992 | Juday | 525/44 |
| 5,135,663 | 8/1992 | Newberth, III et al. | 210/765 |

FOREIGN PATENT DOCUMENTS

| | | |
|---|---|---|
| 570692 | 2/1959 | Canada . |
| 48-7863 | 9/1973 | Japan . |
| WO89/06245 | 7/1989 | PCT Int'l Appl. . |
| 1414476 | 11/1975 | United Kingdom ................ 526/320 |

*Primary Examiner*—Terry J. Owens
*Attorney, Agent, or Firm*—Eugene Zagarella, Jr.

[57] ABSTRACT

A process for impregnating and sealing porous articles wherein the excess impregnant can easily be removed from the surface of the article by washing with water without the use of organic solvents or surfactants either in the aqueous wash solution or the impregnating solution wherein the sealant comprises mixtures of selected acrylate or methacrylate monomers and hydroxy-terminated acrylates or methacrylates.

16 Claims, No Drawings

PROCESS FOR IMPREGNATING POROUS METAL ARTICLES USING WATER MISCIBLE ANAEROBIC SEALANTS

This application is a continuation-in-part of application Ser. No. 07/574,826 filed Aug. 29, 1990, now abandoned.

BACKGROUND OF THE INVENTION

This invention relates to an improved process for impregnating and sealing porous articles such as metal castings using selected water miscible anaerobic sealants wherein excess sealant is easily removed and a cured article is provided with good sealing properties, good heat resistance and low shrinkage.

Porous articles, including metal articles such as castings and sintered metal parts, often need to be impregnated and sealed before use. This is necessary because porosity can cause many different problems, including leakage, and is of particular concern when the articles are subjected to pressure. Impregnating and sealing also improves the articles by strengthening them, reducing their vulnerability to corrosion and preparing their surfaces for subsequent painting or plating operations.

A wide variety of porous metal articles are used commercially today and are manufactured from different metals and alloys such as zinc, copper, iron, aluminum, magnesium and brass. Other materials such as wood, ceramics and fiberglass also frequently need to be sealed.

The need to seal these articles has been recognized by the prior art for many years. The earliest processes generally involved the use of an inorganic sealant such as sodium silicate or a natural organic substance such as varnish. More recently substances such as epoxides, saturated and unsaturated polyesters, and the acrylates have been used in sealing and impregnation techniques.

U.S. Pat. No. 3,672,942 issued Jun. 27, 1972, discloses impregnation with polymerizable anaerobic monomers followed by treating the surface of the impregnated article in an organic solvent solution of an accelerator.

U.S. Pat. No. 3,969,552 issued Jul. 13, 1976 involves an anaerobic impregnation process wherein an aqueous solution of surfactant is used to treat and remove the excess anaerobic sealant from the articles surface.

U.S. Pat. No. 4,165,400 issued Aug. 21, 1979, involves impregnation with anaerobic monomers which are made self-emulsifying and easily removable upon contact with water by incorporating a surfactant in the monomer composition.

U.S. Pat. No. 4,147,821 issued Apr. 3, 1979, discloses a method of impregnating porous articles with a composition of a monofunctional(meth)acrylic ester and a small proportion of polyfunctional (meth)acrylic ester along with a free radical catalyst and inhibitor to effect curing by heating. Excess impregnant is removed by washing with water, if a surfactant is present in the impregnant, or with water containing a surfactant.

In the above noted processes, anaerobic monomers are used with the excess impregnant remaining on the surface of the article being removed by using an organic solvent in one case, by water washing with an aqueous solution containing a surfactant or by water washing an article impregnated with a self-emulsifying composition that already contains a surfactant. Use of solvents involves economic as well as toxicological and ecological disadvantages while the use of surfactants or emulsifiers can have a detrimental effect on the properties and nature of the sealed article. Inclusion of surfactant in the monomer mixture can allow undesired water to be entrapped in the formed polymer. This may result in incomplete sealing since beads of polymer can be separated in the pores by small amounts of water ("popcorn" effect). such entrapped water can also turn into steam at elevated temperatures resulting in a pressure buildup that can destroy the seal.

It has now been found that the use of selected anaerobic water miscible acrylate and methacrylate monomers results in an improved impregnation process where the excess impregnant can be easily removed without the use of an organic solvent or without the use of surfactants either in an aqueous wash solution or in the impregnating composition to render it self-emulsifying and readily water washable. Additionally and significantly, the use of the selected composition provides a sealed article with good heat resistance and good sealing due to low shrinkage of the cured composition. The sealing and impregnation process may be carried out in a system that does not require additives such as plasticizers or thickeners, or a catalyst such as the combination of a tertiary amine and cupric salt, or an inhibitor, to satisfy reactivity conditions. This helps to provide a safer operation, particularly when the vacuum cycle is followed by a pressure cycle, and also maintains good properties in the sealed article that often are deleteriously affected with the incorporation of additives. In addition, the stability of the system is such that refrigeration, frequently required in catalyzed systems, is not needed. Furthermore, the presence of a catalyst system requires constant monitoring and may need the addition of inhibition systems to control sealant stability.

SUMMARY OF THE INVENTION

This invention relates to a process for impregnating and sealing a porous article with a water miscible, anaerobic polymerizable acrylate/methacrylate composition that is initially washable and cures to a heat resistant, shrinkage resistant, impregnant and sealant. More particularly this invention involves a process for impregnating and sealing porous articles which comprises:

A) impregnating the article with a water miscible heat resistant, shrinkage resistant, anaerobic polymerizable acrylate composition comprising:

(1) from about 75 to 90% by weight of a mixture of acrylate or methacrylate monomers having the formula:

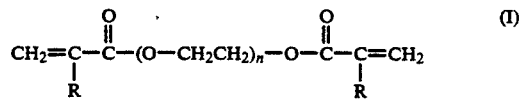

$$CH_2=C-C-(O-CH_2CH_2)_n-O-C-C=CH_2 \quad (I)$$
$$\phantom{CH_2=C-}\overset{|}{R} \phantom{-C-(O-CH_2CH_2)_n-O-C-}\overset{|}{R}$$

in which R is hydrogen or methyl and n is an integer as defined below, the mixture containing: a) from about 25 to 50% by weight of the monomers of formula (I) where n is from about 7 to 11 and b) from about 50 to 75% by weight of the monomer of formula (I) where n is from about 1 to 4;

(2) from about 10 to 25% by weight of an hydroxy-terminated acrylate or methacrylate having the formula:

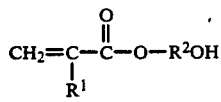

in which $R^1$ is hydrogen or methyl and $R^2$ is ethyl or propyl; and (3) an effective amount of a free radical initiator to initiate cure of the monomers upon exclusion of oxygen;

B) washing the surface of the article with water to remove any excess impregnant; and C) permitting the anaerobic sealant to cure.

DETAILED DESCRIPTION OF THE INVENTION

The use of anaerobic monomers in impregnating and sealing techniques is well known, with such materials characteristically containing acrylate or methacrylate end groups. In an impregnation process the anaerobic sealant composition cures under the anaerobic conditions of the interior of the article forming a hard, durable resin. However, at the surface of the article there is sufficient contact with oxygen to leave a thin film of the impregnant in the uncured or partially cured state. It is desirable to remove this uncured or residual monomer from the surface of articles in a way which will not effect the properties of the finished article and which is easy to accomplish.

The use of selected acrylate and methacrylate monomers in accordance with this invention allows the uncured monomer on the surface to be easily removed with a water wash without the need for surfactants or organic solvents. It is also important that this system substantially comprises reactive monomers without the need for additives and has suitable reactivity characteristics that does not necessitate addition of catalysts such as tertiary amine, copper salt combinations that are often required in anaerobic acrylate and methacrylate compositions.

The acrylate and methacrylate compositions useful in this invention are characterized in that they are water miscible, heat resistant and shrinkage resistant. Miscibility as used in this context is defined by vigorously mixing equal volumes of water and monomer and observing the extent of separation as a function of time. One minute after mixing only a single phase should be present and no separation of materials should be observed. The compositions are heat resistant up to about 150° C., and exhibit shrinkage under 10%.

The water miscible acrylate composition of this invention comprises from about 75 to 90% by weight of a mixture of acrylate or methacrylate monomers having the formula:

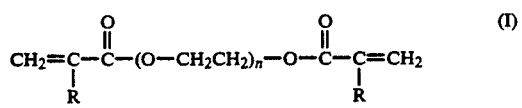

in which each R is hydrogen or methyl, preferably methyl and n is an integer as defined below, the mixture containing: a) from about 25 to 50% by weight of the monomer of formula (I) where n is from about 7 to 11, preferably about 8 to 10 and more preferably about 9 and from about 50 to 75% by weight of the monomers of formula (I) where n is from about 1 to 4, preferably about 3 to 4, more preferably about 4.

Additionally, the water miscible acrylate composition of this invention contains from about 10 to 25% by weight of an hydroxy-terminated acrylate or methacrylate having the formula:

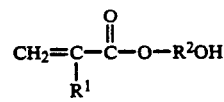

in which $R^1$ is hydrogen or methyl, preferably methyl and $R^2$ is ethyl or propyl, preferably ethyl.

While various anaerobic curing water miscible acrylate and methacrylate monomers may be used, particularly useful and preferred compounds include the following:

diethylene glycol dimethacrylate or diacrylate
triethylene glycol dimethacrylate or diacrylate
tetraethylene glycol dimethacrylate or diacrylate
polyethylene glycol 200 dimethacrylate or diacrylate
polyethylene glycol 400 dimethacrylate or diacrylate
polyethylene glycol 600 dimethacrylate or diacrylate
hydroxyethyl methacrylate
hydroxypropyl methacrylate The monomers described above are given anaerobic characteristics by incorporating therein an appropriate polymerization initiator system. The initiator must be capable of inducing polymerization of the monomer or monomers in the substantial absence of oxygen, and yet not induce polymerization as long as oxygen is present. Since the unsaturated monomers used in this invention are conveniently cured through a free-radical mechanism, the most common initiator system is a redox polymerization initiator, i.e., an ingredient or a combination of ingredients which produce an oxidation-reduction reaction, resulting in the production of free radicals. The most common initiator systems of this type are those involving peroxy materials which, under the appropriate conditions, decompose to form peroxy free radicals.

A class of peroxy initiators which has been found readily adaptable to the anaerobic concept, and particularly efficient when used in combination with the acrylate and methacrylate monomers described above, is the hydroperoxy initiators. Of this class, the organic hydroperoxides are the most preferred. Cumene hydroperoxide has been used with particular success. Inorganic peroxides and compounds such as peresters which decompose to form free radicals are also useful. Thus, as used herein, the term "peroxy" is intended to mean peroxides, hydroperoxides and peresters which are suitable for preparing anaerobically curing monomer systems.

The amount of initiator used can vary widely depending upon conditions and will be an effective amount capable of inducing polymerization of the monomers in the absence of oxygen yet not induce polymerization if oxygen is present. More particularly, the amount of initiator will vary up to 10 percent by weight of the composition, usually between 0.1 to 8 percent and preferably from 0.5 to 5 percent by weight of the composition.

To provide attractive features and versatility to the system, it is sometimes desirable to incorporate additives in the composition. Typical materials include accelerators such as organic cyclic sulfimides, e.g., benzoic sulfimide (saccharin) and tertiary amines, and chelating agents such as tetrasodium ethylenediaminetetraacetate.

The viscosity of the impregnating composition can be varied widely and will depend on the conditions and the inherent properties of the monomers chosen. Typically the viscosity will be from about 1 to 1000 centipoise and preferably from about 1 to 750 centipoise. Viscosity can be measured by a technique such as Cannon-Fenske using standard conditions.

The process of impregnating porous articles may follow any convenient technique where an impregnant or sealant material is applied to the article. Such techniques include vacuum impregnation, coating, dipping, spraying and pressure injection. When articles of relatively uniform porosity are used and the articles are to be sealed only against low pressure, it is possible to use a dipping technique. For sealing under higher pressure or for maximum reliability and durability, it is usually necessary to use vacuum impregnation where the pores of the article are evacuated to insure their filling with impregnant. This generally is accomplished by placing the porous articles in a vacuum vessel, sealing the vessel and then drawing a vacuum within it and retaining such vacuum until the pores of the porous article have been suitably evacuated. The most desirable method of accomplishing this evacuation is using a wet vacuum technique where the porous articles are submerged in the anaerobic impregnant which is in a vacuum vessel. When a vacuum is drawn on the vessel, the gases in the interstices of the article will be removed and the vacuum is released while the articles are still covered with impregnant. The increased pressure will drive the impregnant into the evacuated interstices thus completing the process. Upon cure, the impregnant or sealants form a hard and durable seal.

Alternatively, a dry vacuum impregnation technique may be carried out when the articles are placed in an empty pressure vessel, evacuated to remove the gases from the interstices or pores and then inserting the impregnant or sealant material in the vessel. After sufficient sealant has been added to the vessel to cover the porous articles, the vacuum can be released to complete the sealing or impregnating operation.

The above and other typical methods of impregnation are well known in the art and are described for example in U.S. Pat. Nos. 3,672,942; 3,969,552; and 4,147,821. Various alternatives in processing techniques, conditions and apparatus may be used in impregnating the porous articles. Vacuum impregnation is a preferred technique, particularly where porous metal articles are to be sealed. The conditions used in carrying out vacuum impregnation can vary widely within known and standard practices with a vacuum of up to 1 inch of Hg being sufficient for most applications and times of up to 10 to 20 minutes usually being sufficient. Variations in technique, equipment and desired results may require different conditions.

A typical process of impregnating porous articles will generally follow such known procedures and will comprise the basic steps of cleaning and degreasing the articles, immersing in impregnant composition and subjecting to vacuum to remove air from pores, releasing vacuum to force impregnant into the pores and interstices, removing excess resin with water rinse and centrifuging, and curing anaerobic impregnant at the surface by exposing to an activator followed by final rinse.

The following examples serve to illustrate further the embodiments of the present invention. In the examples all parts and percentages are given by weight unless otherwise noted.

EXAMPLE 1

An anaerobic impregnating composition was prepared having the following formulation:

| | |
|---|---|
| tetraethylene glycol dimethacrylate | 43.2% |
| poly(ethylene glycol) 400 diacrylate* | 40.7% |
| hydroxypropyl methacrylate | 14.1% |
| tetrasodium salt of ethylenediaminetetraacetic acid (5% solution in 1:1 methanol/deionized water) | 0.5% |
| saccharin (ortho-benzoic acid sulfimide) | 0.5% |
| cumene hydroperoxide | 1.0% |
| | 100.0% |

*A product having an average of nine repeating ethoxy groups per polymer.

A porous metal article (a thin walled (1/32") aluminum rectangular tube) was vacuum impregnated by immersing the article in a tank containing the above described impregnant composition which was saturated with air. The tank was evacuated to 29 inches Hg for 10 minutes to remove air and then returned to ambient pressure to force the impregnant into the pores of the article. The part was centrifuged and water rinsed to remove excess impregnant at the surface and then placed in a vessel containing an activator to cure the anaerobic at the surface and then given a final water rinse.

Complete cure of the sealant took place in 1 to 3 hours. The article was suitably sealed and had a clear surface with no anaerobic impregnating material on the surface. The article was pressure tested at 50 psi, showing suitable sealing and no detrimental shrinkage. The article was also subjected to lubricating oil at 255° F. for 48 hours and still remained sealed.

EXAMPLE 2

For comparative purposes an aluminum part was vacuum impregnated in the same manner as that described in Example 1 using the following impregnant composition.

| | % by weight |
|---|---|
| tetraethylene glycol dimethacrylate | 70.0 |
| lauryl methacrylate | 13.0 |
| hydroxypropyl methacrylate | 15.0 |
| tetrasodium salt of ethylenediaminetetraacetic acid (5% solution in 1:1 methanol/deionized water) | 0.5 |
| saccharin | 0.5 |
| cumene hydroperoxide | 1.0 |
| | 100.0% |

After impregnation, the part was removed from the sealant and washed in a water tank. After drying, the part had a thin oily layer present on the surface indicating that this formulation, unlike the one in Example 1, was not water washable.

EXAMPLE 3

An aluminum part was vacuum impregnated in the same manner as in Example 1 using diethylene glycol dimethacrylate in place of tetraethylene glycol dimethacrylate. After the water rinse and cure, the article was suitably sealed and had a clean surface with no impregnating material remaining thereon.

EXAMPLE 4

A comparative test was made to show the effect the use of a surfactant in the impregnating composition had. Two samples, one containing the anaerobic water miscible acrylate/methacrylate sealant of Example 1, which contained no surfactant, and a commercially available anaerobic acrylate sealant called Resinol RTC, a trademark and product of Loctite Corp., which had a non-ionic surfactant, were used. Into two test tubes, 5 cc of the respective sealant materials along with 5 cc of water and 60 ppm of copper naphthenate were added.

The test tubes were shaken and immediately placed in a heated bath to polymerize the sealant. After polymerization, test tube A which contained the sealant having a surfactant was found to resemble "popcorn" in color and shape indicating the presence of entrapped water. Test tube B containing the sealant of this invention (Example 1) and no surfactant was found to contain clear solid polymer at the base and a layer of clear water on top. The water was not entrapped but was displaced as polymerization took place.

What is claimed is:

1. A process for impregnating and sealing a porous article comprising the steps of:
   A) impregnating the article with a water miscible, anaerobic polymerizable acrylate composition which contains no organic solvents or surfactants and comprises:
      1) from about 75-90% by weight of a mixture of acrylate or methacrylate monomers having the formula:

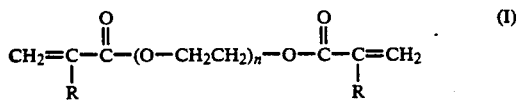

in which each R is hydrogen or methyl and n is an integer as defined below, the mixture containing: a) from about 25 to 50% by weight of the monomers of formula (I) where n is from about 7 to 11 and b) from about 50 to 75% by weight of the monomers of formula (I) where n is from about 1 to 4;
      2) from about 10 to 25% by weight of an hydroxy-terminated acrylate or methacrylate having the formula:

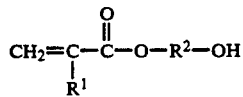

In which $R^1$ is hydrogen or methyl and $R^2$ is ethyl or propyl; and 3) an effective amount of a free radical initiator to initiate cure of the monomers upon exclusion of oxygen;
   B) washing the surface of the article with water to remove any excess impregnant; and
   C) permitting the anaerobic sealant to cure.
2. The process of claim 1 wherein the porous article is impregnated using vacuum impregnation.
3. The process of claim 1 wherein $R^2$ is ethyl.
4. The process of claim 3 wherein R is methyl and $R^1$ is methyl.
5. The process of claim 1 wherein in the mixture of monomers, component a) has an n of from about 8 to 10 and component b) has an n of about 3 to 4.
6. The process of claim 5 wherein $R^2$ is ethyl.
7. The process of claim 6 wherein R is methyl and $R^1$ is methyl.
8. The process of claim 7 wherein the porous article is impregnated using vacuum impregnation.
9. The process of claim 8 wherein n in component a) is about 9 and n in component b) is about 4.
10. A water miscible, anaerobic polymerizable acrylate composition which contains no organic solvents or surfactants and comprises:
    1) from about 75 to 90% by weight of a mixture of acrylate or methacrylate monomers having the formula:

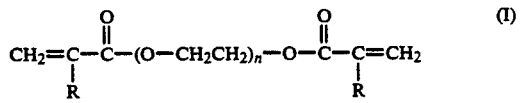

in which each R is hydrogen or methyl and n is an integer as defined below, the mixture containing: a) from about 25 to 50% by weight of the monomers of formula (I) where n is from about 7 to 11 and b) from about 50 to 75% by weight of the monomers of formula (I) where n is from about 1 to 4;
    2) from about 10 to 25% by weight of an hydroxy-terminated acrylate or methacrylate having the formula:

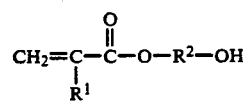

in which $R^1$ is hydrogen or methyl and $R^2$ is ethyl or propyl; and
    3) an effective amount of a free radical initiator to initiate cure of the monomers upon exclusion of oxygen.
11. The composition of claim 10 wherein $R^2$ is ethyl.
12. The composition of claim 11 wherein R is methyl and $R^1$ is methyl.
13. The composition of claim 10 wherein in the mixture of monomers, component a) has an n of from about 8 to 10 and component b) has an n of from about 3 to 4.
14. The composition of claim 13 wherein $R^2$ is ethyl.
15. The composition of claim 14 wherein R is methyl and $R^1$ is methyl.
16. The composition of claim 15 wherein n in component a) is about 9 and n in component b) is about 4.

* * * * *